United States Patent
Cheng

(10) Patent No.: US 9,058,706 B2
(45) Date of Patent: Jun. 16, 2015

(54) MOTOR VEHICLE CAMERA AND MONITORING SYSTEM

(75) Inventor: Edward Cheng, Hong Kong (CN)

(73) Assignee: CONVOY TECHNOLOGIES LLC, Indianapolis, IN (US)

( * ) Notice: Subject to any disclaimer, the term of this patent is extended or adjusted under 35 U.S.C. 154(b) by 474 days.

(21) Appl. No.: 13/460,828

(22) Filed: Apr. 30, 2012

(65) Prior Publication Data

US 2013/0286204 A1 Oct. 31, 2013

(51) Int. Cl.
- H04N 7/18 (2006.01)
- G08B 21/00 (2006.01)
- B60Q 1/00 (2006.01)
- G07C 5/08 (2006.01)
- H04N 5/33 (2006.01)

(52) U.S. Cl.
CPC .............. *G07C 5/0866* (2013.01); *H04N 5/33* (2013.01)

(58) Field of Classification Search
USPC .................................................. 348/31–161
See application file for complete search history.

(56) References Cited

U.S. PATENT DOCUMENTS

| | | | | |
|---|---|---|---|---|
| 6,211,907 B1 * | 4/2001 | Scaman et al. | ................ | 348/148 |
| 6,246,320 B1 * | 6/2001 | Monroe | ........................ | 340/506 |
| 6,593,848 B1 * | 7/2003 | Atkins, III | ................. | 340/426.1 |
| 7,027,719 B1 * | 4/2006 | Schneider et al. | ............ | 386/224 |
| 7,173,526 B1 * | 2/2007 | Monroe | ........................ | 340/521 |
| 7,304,568 B2 * | 12/2007 | Ohkawara et al. | ............ | 340/438 |
| 7,576,767 B2 * | 8/2009 | Lee et al. | ........................ | 348/36 |
| 8,379,924 B2 * | 2/2013 | Schaufler | ...................... | 382/104 |
| 8,396,943 B2 * | 3/2013 | Okaya et al. | .................. | 709/219 |
| 8,643,715 B2 * | 2/2014 | Cho | ............................... | 348/113 |
| 8,676,428 B2 * | 3/2014 | Richardson et al. | ............ | 701/25 |
| 2003/0067542 A1 * | 4/2003 | Monroe | ........................ | 348/148 |
| 2003/0093805 A1 * | 5/2003 | Gin | ................................ | 725/105 |
| 2004/0017282 A1 * | 1/2004 | Eguchi et al. | .............. | 340/425.5 |
| 2004/0233124 A1 * | 11/2004 | Eggers et al. | ................. | 345/1.1 |
| 2006/0259933 A1 * | 11/2006 | Fishel et al. | ................. | 725/105 |
| 2007/0035625 A9 * | 2/2007 | Hamdan et al. | ............... | 348/148 |
| 2007/0177014 A1 * | 8/2007 | Frenzel et al. | ................ | 348/148 |
| 2009/0040300 A1 * | 2/2009 | Scribner | ........................ | 348/143 |
| 2009/0244361 A1 * | 10/2009 | Gebauer et al. | ............... | 348/373 |
| 2010/0013628 A1 * | 1/2010 | Monroe | ................... | 340/539.18 |
| 2010/0060733 A1 * | 3/2010 | Lakshmanan | ................. | 348/143 |
| 2011/0058041 A1 * | 3/2011 | Kister | ........................... | 348/149 |
| 2011/0188122 A1 * | 8/2011 | Habibi et al. | ................. | 359/604 |
| 2012/0212620 A1 * | 8/2012 | Hashimoto | .................... | 348/164 |
| 2013/0033599 A1 * | 2/2013 | Dayan et al. | ................... | 348/148 |
| 2013/0070056 A1 * | 3/2013 | Tripathi | ........................... | 348/46 |
| 2013/0083196 A1 * | 4/2013 | Zheng | ........................... | 348/148 |
| 2013/0194381 A1 * | 8/2013 | McMahon et al. | .............. | 348/36 |
| 2013/0245881 A1 * | 9/2013 | Scarbrough | ..................... | 701/36 |
| 2014/0085445 A1 * | 3/2014 | Joao et al. | ........................ | 348/61 |
| 2014/0114555 A1 * | 4/2014 | Lagassey | ..................... | 701/117 |

\* cited by examiner

*Primary Examiner* — Joseph Ustaris
*Assistant Examiner* — Talha Nawaz
(74) *Attorney, Agent, or Firm* — Blakely Sokoloff Taylor & Zafman LLP

(57) ABSTRACT

A camera that is mounted on a vehicle is used to monitor the vehicle, the driver and the contents therein. The camera includes an external housing, a camera module having a camera lens, a lighting component, a dimmer switch and a transmission medium. The external housing may be made of alloy. The camera module may capture video data and the transmission medium may be coupled to the camera module to transmit the captured video data as a live video stream to an external device. The lighting component included in the fleet camera apparatus may include LEDs and have infra-red capabilities to provide a night vision mode. The dimmer switch is included to control the LEDs' brightness. Other embodiments are disclosed.

29 Claims, 5 Drawing Sheets

MOTOR VEHICLE CAMERA AND MONITORING SYSTEM

FIELD

An embodiment of the invention relate generally to camera used on motor vehicles which includes heavy-duty fleet vehicles and a system for monitoring these vehicles.

BACKGROUND

When products are manufactured at a factory, the supervisor is able to monitor the assembly line using surveillance cameras to ensure that the products are being handled appropriately and that the employees are safely performing their jobs. The surveillance cameras also ensure that there is accountability when there are issues in the factory. However, once the product is loaded onto a commercial truck for shipping, the supervisor are no longer able to monitor the truck, the driver or the cargo in the same manner as he could in the factory.

Similarly, in the transportation industry, the supervisor is unable to monitor the driver's driving or his interactions with the passengers. The supervisor is currently dependent on feedback from the passengers to uncover a driver's misconduct. Further, there is no way for the supervisor to have access to a "black box" to determine what transpired when there is an accident and black box is destroyed. Further, when the driver is subjected to danger on the bus, there is no evidence to identify his aggressors.

Moreover, in the waste industry, two workers are typically needed on each truck: the driver and the person on picking up the garbage bags. Just as in public transportation industry, the waste industry supervisor is also unable to monitor the workers to ensure their safety and he is also unable to review the workers' on-the-job conduct.

SUMMARY

In one embodiment of the invention, a fleet camera apparatus is used to monitor of fleet vehicles. This fleet camera apparatus may be mounted on a fleet vehicle to capture video data. Based on the location of the fleet camera apparatus, the captured video data may provide images of the inside or outside of the fleet vehicle. This video data may be streamed using a client device such as a smart phone or a laptop. In this embodiment, the fleet camera apparatus comprises an external housing, a camera lens cover, a camera module including a camera lens, a lighting component, a dimmer switch, and a transmission medium. The external housing may be made of alloy and may have a front side, a back side, an extended hooded portion, and a base for mounting the apparatus. The fleet camera apparatus may further include a camera cover being fitted on a first opening on the front side of the external housing and a camera module that captures video data and includes a camera lens that faces the camera cover. The transmission medium may be coupled to the camera module to transmit the captured video data as a live video stream to an external device. The lighting component included in the fleet camera apparatus may include light-emitting diodes (LEDs) and have infra-red (IR) capabilities to provide a night vision mode. The lighting component may also be facing the camera cover. The dimmer switch is included in the fleet camera apparatus to control the brightness of the lighting component.

In another embodiment of the invention, a system for monitoring of fleet vehicles comprises a plurality of cameras and a network device. Each of the plurality of cameras may include an external housing made of alloy and having a front side and a back side, a camera cover being fitted on a first opening on the front side of the external housing, a camera module including a camera lens that faces the camera cover to capture video data, a lighting component facing the camera cover and including a plurality of light-emitting diodes (LEDs) and having infra-red (IR) capabilities to provide a night vision mode, a dimmer switch controlling the brightness of the lighting component; and a transmission medium coupled to the camera module to transmit the video data as a live video stream. The network device may include a communication interface and a recording unit. The communication interface is coupled to the transmission medium of each of the cameras to receive the live video stream, and is coupled to the cloud storage to transmit the live video stream. The recording unit of the network device may record the live video stream. At least one client device may access the cloud storage to receive the live video stream.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
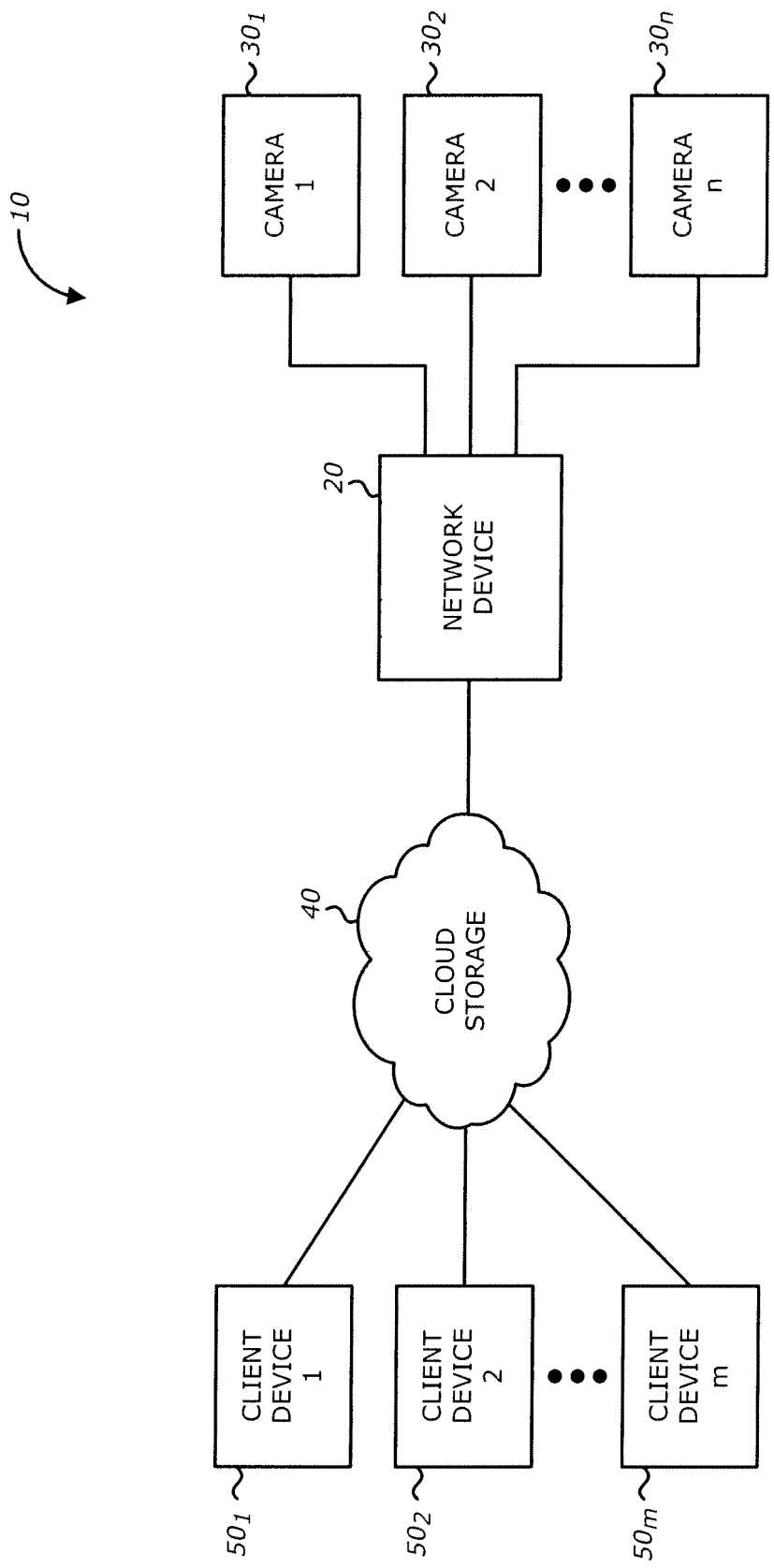
FIG. 1 shows an exemplary block diagram of a system in which one embodiment of the invention may be implemented.

FIG. 1 shows an exemplary block diagram of a system in which one embodiment of the invention may be implemented. The system 10, as illustrated in FIG. 1, includes a network device 20, a plurality of cameras $30_1$-$30_n$ (n>1), a cloud storage 40, and a plurality of client devices $50_1$-$50_m$ (m>1).

Figure 2:
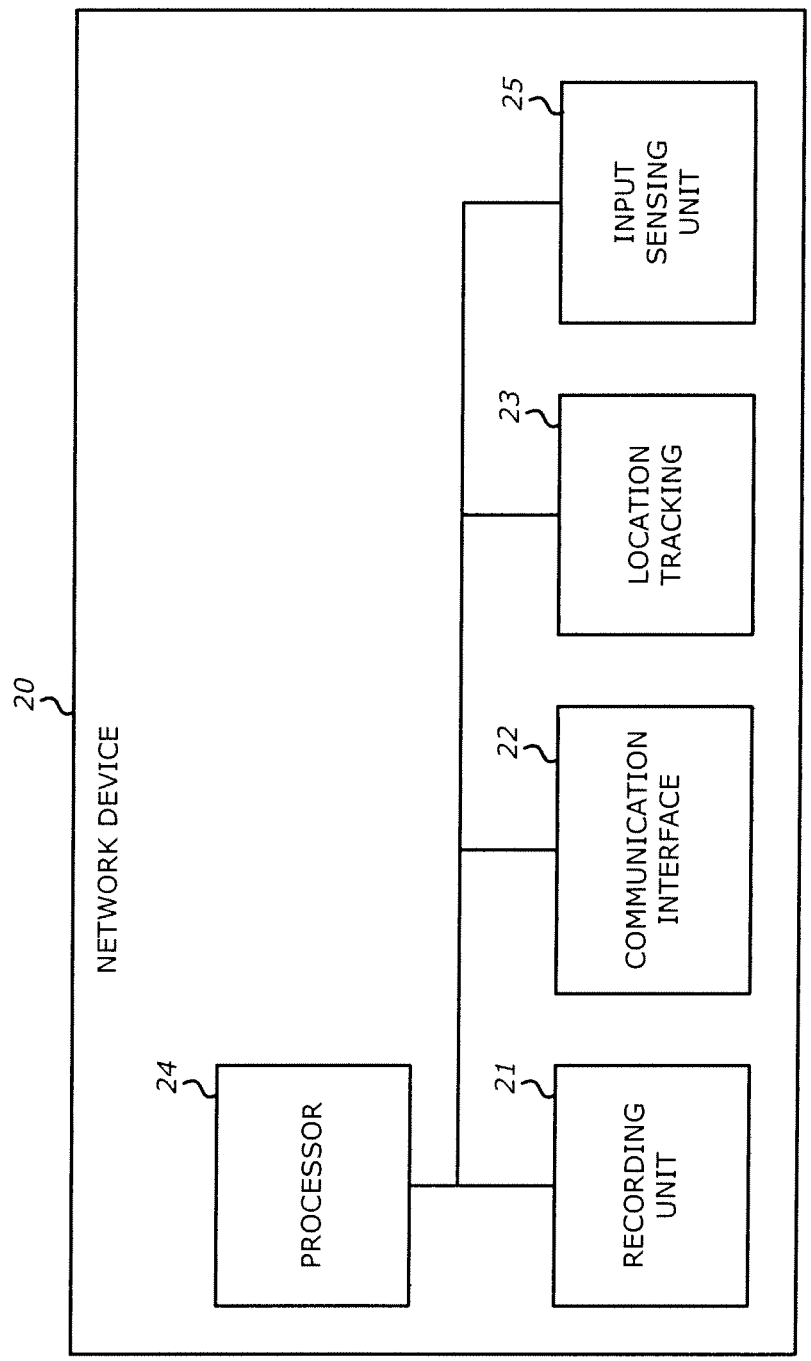
FIG. 2 shows an exemplary block diagram of a network device according to one embodiment of the invention.

The network device 20 may be a digital device that is coupled to the cameras $30_1$-$30_n$ to receive live video streams from each of the cameras $30_1$-$30_n$ on the motor vehicles. While it is contemplated that the cameras may be mounted on a heavy-duty fleet vehicle such as a tractor-trailer truck, it is understood that the cameras $30_1$-$30_n$ may be mounted on all kinds of motor vehicle (e.g., bus, garbage truck, truck, car, etc. . . . ). In FIG. 2, an exemplary block diagram of a network device 20 according to one embodiment of the invention is shown. As illustrated in FIG. 2, the network device 20 may include a recording unit 21, a communication interface 22, a location tracking unit 23, an input sensing unit 25, and a processor 24.

The processor 24 may be coupled to the recording unit 21, the communication interface 22, the location tracking unit 23, and the input sensing unit 25. The processor 24 may be any processing device including, but not limited or restricted to a microprocessor, a digital signal processor, an application specific integrated circuit, a microcontroller, a state machine, or any type of programmable logic array.

The communication interface 22 may include a wired network interface such as an Ethernet interface and a wireless interface such as a WiFi interface. The communication interface 22 receives a live video stream from the cameras $30_1$-$30_n$. In one embodiment, the wired network interface of the communication interface 22 is coupled to a transmission medium of a camera $30_1$ and the wired network interface receives the live video stream from the camera $30_1$. The communication interface 22 may also include a mobile communication interface that communicates with a mobile telecommunication network such as 3G and 4G. In one embodiment, the communication interface 22 uses the mobile communication interface to transmit the live video stream received from the camera $30_1$ to the cloud storage 40. In another embodiment, the communication interface 22 uses the wireless interface to transmit the live video stream received from the camera $30_1$ to the cloud storage 40. It is also contemplated that the communication interface 22 may use any combination of the mobile communication interface and the wireless interface to transmit the live video stream to the cloud storage 40.

As further illustrated in FIG. 2, the network device 20 may also include the location tracking unit 23 that receives the location of the network device 20. The location tracking unit 23 may include a Global Positioning System (GPS) receiver to receive the location of the network device 20 as positioning coordinates (e.g., longitude and latitude). In some embodiments, the processor 24 associates the location of the network device 20 with the corresponding video data received by the communication interface 22. Accordingly, in this embodiment, the communication interface 22 transmits the live video stream and a corresponding location to the cloud storage 40. For example, when a supervisor views the live video stream of a delivery truck on a client device $50_1$, the client device $50_1$ may also display on a visual map the location of the delivery truck associated with the live video display. Additionally, if the supervisor requests to view a video corresponding to a specific date and time, when the video is displayed, the location of the truck at that specific date and time may also be displayed for the supervisor.

In one embodiment, the recording unit 21 included in the network device 20 includes a digital video recorder. The recording unit 21 may is coupled to the communication interface 22 to record the live video stream received from the camera $30_1$.

In another embodiment, the network device 20 is also coupled to the motor vehicles on which the cameras $30_1$-$30_n$ are respectively mounted. The motor vehicles may include a plurality of motor vehicle sensors such as temperature sensors, speed sensors, door status sensors, engine loading sensors, water data sensors, oil data sensors, etc. The network device 20 may receive data from the motor vehicles sensors and send this data to the cloud storage 40. In this embodiment, the processor 24 may associate the data from the motor vehicle sensors with the corresponding video data received by the communication interface 22 such that a client device $50_1$ that accesses the cloud storage 40 may obtain this data in conjunction with the video data (e.g., live or recorded).

In another embodiment, the network device 20 is also equipped with an input sensing unit 25 which automatically senses the communication interface 22's inputs and determines if a connection is established with each of the inputs. For instance, the input sensing unit 25 may sense which input has a camera $30_1$-$30_n$ coupled thereto. If the input sensing unit 25 senses that a first input is coupled to camera $30_1$, the input sensing unit 25 will send a signal to the processor 24 that camera $30_1$ is connected, and the communication interface 22 transmits the live video stream from camera $30_1$ to the cloud storage 40 and in turn, to at least one client device $50_1$-$50_m$ to be displayed. If the input sensing unit 25 senses that a second input is not coupled to camera $30_2$, the input sensing unit 25 may send a signal to the processor 24 indicating that camera $30_2$ is not connected and the communication interface 22 will not transmit any data to the cloud storage 40. By not sending any data between the network device 20 and the cloud storage 40, this embodiment of the invention minimizes unnecessary data transfers (e.g., blank screens) and thus, improves the bandwidth usage in the system 10 between the network device 20, the cloud storage 40, and the client devices $50_1$-$50_m$.

In other embodiments, the input sensing unit 25 may send an enable signal which indicates that a connection is made between a camera $30_n$ and an input included in the communication interface 22 and may not send any signal when the input sensing unit 25 senses that no connection established.

Referring back to FIG. 1, the system 10 also includes the cloud storage 40 that is an online storage that may be hosted by a third party. The cloud storage 40 receives the live video streaming from the network device 20 and may be accessed through a Web-based user interface or through a web service application programming interface (API) by the plurality of client devices $50_1$-$50_m$.

The client devices $50_1$-$50_m$ may be coupled to the cloud storage 40 via a wireless connection or via a mobile telecommunication connection. For example, the client device $50_1$ may be a smart phone and the user may access the cloud storage 40 via a Web-based user interface on the smart phone using a wireless connection to the Internet or using a 3G or 4G network. It is contemplated that the client devices $50_1$-$50_m$ may be wireless electronic devices capable of receiving the live video streams such as personal computers, laptop computers, wireless music players, portable telephone communications devices, smart phones, tablets, digital televisions, etc.

Referring back to FIG. 1, the system 10 also includes a plurality of cameras $30_1$-$30_n$. The cameras $30_1$-$30_n$ may be mounted on a motor vehicle such as a fleet vehicle to capture video data and provide the live data stream to the network device 20. Based on the location of the cameras $30_1$-$30_n$ on the fleet vehicle, the captured video data may provide images of the inside or outside of the fleet vehicle. The cameras $30_1$-$30_n$ may be mounted on the exterior of the fleet vehicle (e.g., rear, front, sides, top, bottom) and in the interior of the fleet vehicle (e.g., facing the driver, facing the cargo, facing the road ahead). In one embodiment, a camera $30_1$ may be mounted on the top and back of the fleet vehicle and aimed at about a 45 degree angle to view the rear of the fleet vehicle.

Figure 3:
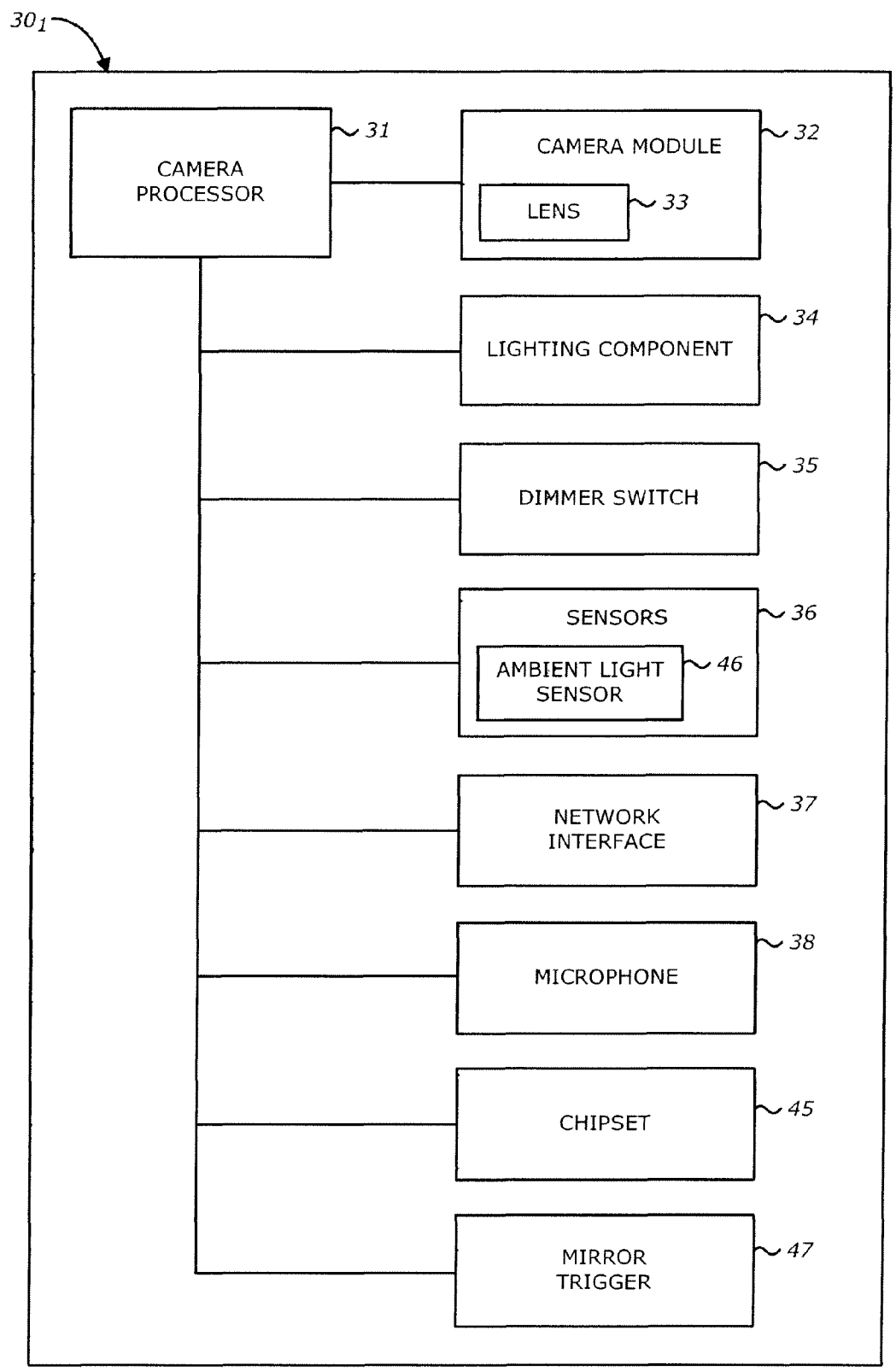
FIG. 3 shows an exemplary block diagram of a camera according to one embodiment of the invention.

FIG. 3 shows an exemplary block diagram of a camera according to one embodiment of the invention. Further, FIG. 4A shows a front side view of the camera and FIG. 4B shows a back side view of the camera according to one embodiment of the invention.

Figure 4A:
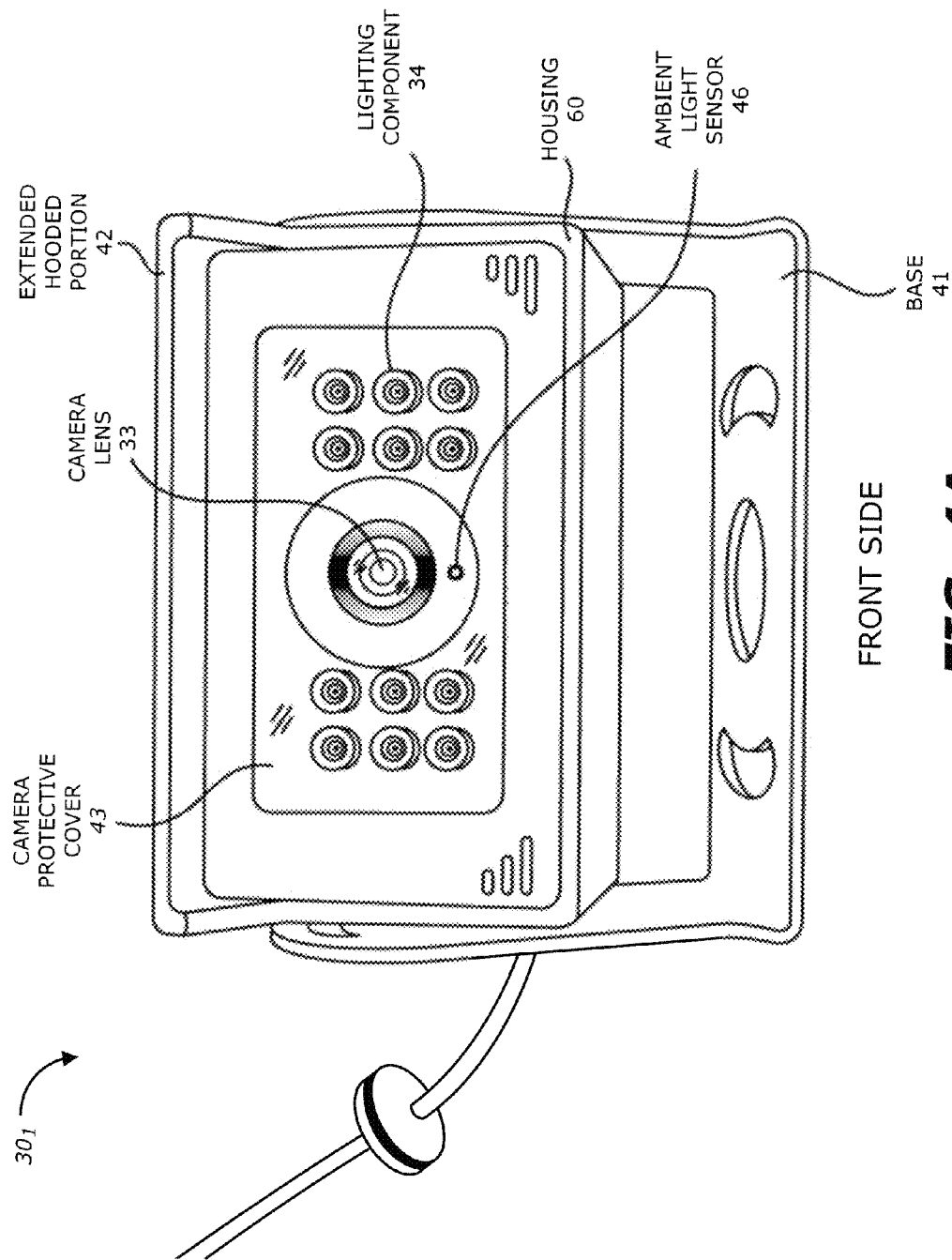
FIG. 4A shows a front side view of the camera according to one embodiment of the invention.
Figure 4B:
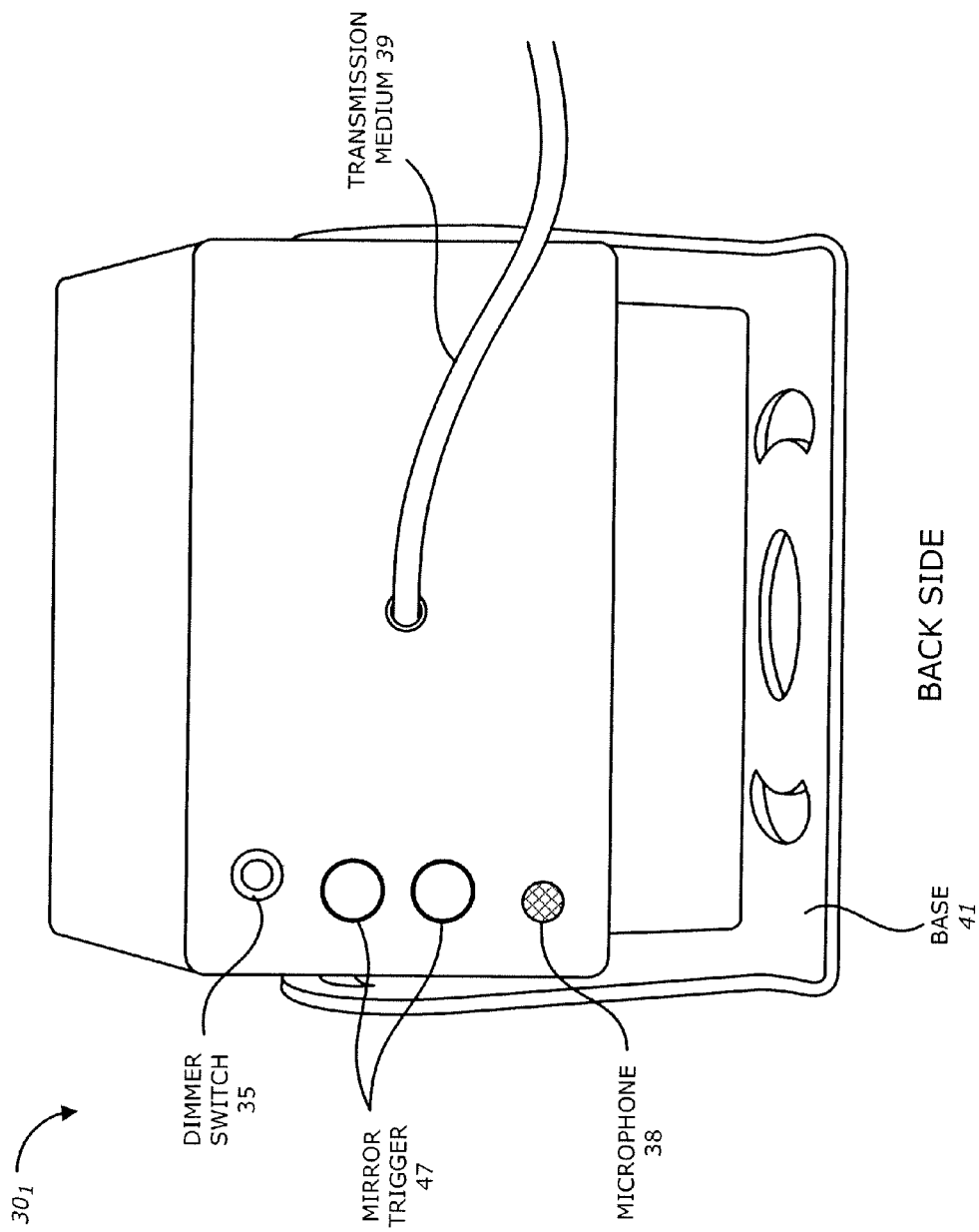
FIG. 4B shows a back side view of the camera according to one embodiment of the invention.

The camera $30_1$, as illustrated in FIGS. 3 and 4A-4B, are designed to be able to be mounted on any motor vehicle including heavy-duty fleet vehicles. Accordingly, the external housing 60 is made of an alloy material to ensure that the camera $30_1$ is robust. Further, since the fleet vehicles are normally cleaned using pressure hoses, the camera $30_1$ is designed to have an IP69K rating. Thus, the camera $30_1$ is designed to be dust-tight as well as withstand high-pressure, high-temperature washes. By preventing the moisture from entering the camera $30_1$, the camera $30_1$ is ensured not to be encumbered by a foggy camera lens or camera protective cover 43 (see FIG. 4A). It is also contemplated that the external housing 60 can be made of any sufficiently robust material that does not affect the camera $30_1$'s IP69K rating. As shown in FIGS. 4A and 4B, the camera $30_1$ may also include a base 41 that is an alloy bracket that is used to mount the camera $30_1$. In some embodiments, the base 41 is included as part of the external housing 60. As shown in FIGS. 4A and 4B, the camera $30_1$ may also include an extended hooded portion 42 to optimize the image captured by the camera $30_1$. The extended hooded portion 42 may also be used to effectively block out the sun such that the options of positions and placements of the camera $30_1$ on the vehicle are further increased. In some embodiments, the extended hooded portion 42 is included as part of the external housing 60 and made of an alloy material.

Referring to FIG. 3, the camera $30_1$ comprises a camera processor 31, a camera module 32 including a camera lens 33, a lighting component 34, a dimmer switch 35, a plurality of sensors 36 including an infra-red sensor 46, a network interface 37, microphone 38, a chipset 45, and a mirror trigger 47.

The camera processor 31 is coupled to the camera module 32, the lighting component 34, the dimmer switch 35, the sensors 36, the network interface 37, the microphone 38, the chipset 45 and the mirror trigger 47. The camera processor 31 may be any processing device including, but not limited or restricted to a microprocessor, a digital signal processor, an application specific integrated circuit, a microcontroller, a state machine, or any type of programmable logic array. In one embodiment, the camera processor 31 communicates with the chipset 45, which may be a plurality of integrated circuits (IC) or chips, to control the functions of each of the components of the camera $30_1$.

The camera module 32 includes a camera lens 33 and an image sensor to capture video data. In some embodiments, the camera module 32 is a digital camera that includes High-Definition (HD) Resolution and long range night vision capabilities. For instance, the camera module 32 may include a 720P or 1080P HD Resolution and may effectively capture at least 100 feet in distance in night vision mode. The camera lens 33 may be a wide-angle lens that provides, for example, a viewing angle of 170 degrees. The greater horizontal reach of this wide-angle lens provides a better viewing coverage. In some embodiments, the camera module 32 is provided with a mirror function which changes the video image provided by the camera $30_1$. When the mirror function is activated, the video image provided by the camera $30_1$ is the mirror image of the view as seen by the camera $30_1$. In the embodiments where the camera $30_1$ is mounted on the rear of the fleet vehicle to view the back of the fleet vehicle, the mirror function is normally activated. When the mirror function is deactivated, the video image provided by the camera is the view as seen by the camera $30_1$. In the embodiments where the camera $30_1$ is mounted on the front of the fleet vehicle and facing forward or outward, the mirror function is normally deactivated. The mirror function may be activated or deactivated via a mirror trigger 47. As shown in FIG. 4B, the mirror trigger 47 may be located on the back side of the camera $30_1$. In some embodiments, the mirror trigger 47 is an external magnetic trigger such that the mirror trigger 47 does not compromise the camera $30_1$'s waterproof integrity. For instance, since an external magnet may interact with internal magnets even if the magnets are separated by a wall (e.g., housing 60), no holes are required to be made in the housing 60 such that the waterproof integrity of the camera is maintained. In the embodiment illustrated in FIG. 4B, the back side of the housing 60 includes two threaded sealed holes that are configured to receive a screw-magnet which is a screw that includes a magnet. In this embodiment, the threaded sealed holes and the screw-magnet form the mirror trigger 47. As shown in FIG. 4B, each of the threaded sealed holes may have the appearance of a circular indent into the housing 60 and may have threads on the perimeter. In this embodiment, the screw-magnet may have a disc-like shape and the threads of the threaded sealed holes may be coupled to the threads on the screw-magnet. In this embodiment, when the screw-magnet is coupled with the top threaded sealed hole, the magnet in the screw-magnet interacts with internal magnets to activate the mirror function. Similarly, when the screw-magnet is coupled with the bottom threaded sealed hole, the mirror function is deactivated. In another embodiment, the mirror trigger 47 may include a single threaded sealed hole on the housing 60 and when a screw-magnet is coupled to the single threaded sealed hole, the mirror function is activated and when the screw-magnet is not coupled to the single threaded sealed hole, the mirror function is deactivated.

As illustrated in FIG. 4A, a camera protective cover 43 is fitted on an opening on the front side of the external housing 60 and the camera lens 33 is located to face the camera protective cover 43. With this configuration, the camera lens 33 is protected from being damaged by the camera protective cover 43 and the camera module 32 is also able to capture images as seen through the camera protective cover 43. In some embodiments, the camera protective cover 43 is made of glass.

As shown in FIG. 4A, the lighting component 34 may be a plurality of light-emitting diodes (LEDs). The lighting component 34 may also having infra-red (IR) capabilities to provide a night vision mode. In some embodiments, the night vision mode of the camera $30_1$ allows for up to 100 feet of night vision distance. As illustrated in FIG. 4A, the lighting component 34 is located to face the camera protective cover 43. With this configuration, when the lighting component 34 is activated, it may provide adequate lighting for the video data to be captured by the camera module 32. Further, with this configuration, the lighting component 34 may be activated in order for the camera $30_1$ to be in the night vision mode.

As shown in FIG. 4B, the back side of the camera $30_1$ may include a microphone 38 to receive sounds, a transmission medium 39 to transmit the video data captured by the camera module 32 as a live video stream to the network device 20, and a dimmer switch 35 used to control the brightness level of the lighting component 34. In one embodiment, the back side of the camera $30_1$ includes a plurality of openings to provide for the microphone 38 to receive sounds, the transmission medium 39 to access the exterior of the camera $30_1$ and the dimmer switch 35 to be accessible. In some embodiments, the dimmer switch 35 protrudes from an opening in the back side of the housing 60 and in other embodiments, the dimmer switch 35 is flush with the back side of the housing 60 or depressed into the housing 60. It is contemplated that the dimmer switch 35 may be implemented as, for example, a push-button, a touch activated button, or a dial to set the desired brightness level of the light component. It is further understood that each of the openings in the housing 60 may be sealed to maintain the waterproof integrity of the camera $30_1$.

As shown in FIG. 3, camera $30_1$ may also include a microphone 38. In some embodiments, based on the location of the camera $30_1$ on the fleet vehicle, the microphone 38's port may be situated on the housing 60 at any location that minimizes the amount of wind resistance that may cause noise interference with the audio recording. For example, in the embodiment illustrated in FIG. 4B, the microphone 38 is located on the back side of the camera $30_1$ to increase the sound quality obtained by the microphone 38. For instance, in embodiments where the camera $30_1$ is mounted facing forward on a fleet vehicle, when the fleet vehicle is travelling forward, microphone 38 may be shielded from the wind. In another embodiment, the microphone 38 may be located on the underside of the housing 60. The transmission medium 39 may be a wire or Ethernet cord that is coupled to the network interface 37 of the camera $30_1$ and the network device 20. In one embodiment, the network interface 37 is a wired network interface such as an Ethernet interface.

Referring to FIGS. 3 and 4A, the camera $30_1$ may comprise the sensors 36 which include, for example, ambient light sensors 46, sensors for detecting movement, position and/or orientation (e.g., accelerometers, gyroscopes,) etc. In one embodiment, the ambient light sensor 46 is used to determine whether the camera $30_1$ is being used in the daytime or nighttime. For instance, the ambient light sensor 46 may detect a high level of light and provide a signal to the camera processor 31 indicating this high level of light. Based on this signal, the camera processor 31 may automatically deactivate the lighting component 34 given that the lighting component 34 is not needed during the daytime. Similarly, the ambient light sensor 46 may detect a low level of light and provide a signal to the camera processor 31 indicating this low level of light. Based on this signal, the camera processor 31 may automatically activate the lighting component 34 to place the camera $30_1$ automatically in night vision mode. In some embodiments, the lighting component 34 may activate infra-red lights in night vision mode.

In one embodiment, when the ambient light sensor 46 detects the low light level consistent with nighttime and the camera processor 31 automatically activates the lighting component 34, the user may trigger the dimmer switch 38 once in order to decrease the brightness of the lighting component 34 by a predetermined amount. For example, when the camera processor 31 automatically activated the lighting component 34, the default brightness level may be set to 100%. By triggering the dimmer switch 38 once, the user may decrease the brightness level to 80%. In some embodiments, if the user triggers the dimmer switch 38 a second time, the user may further decrease the brightness level to 60%. Accordingly, based on repeated triggering of the dimmer switch 38, the user may set the brightness level of the lighting component 34 to the desired level.

In some environmental situations, the lighting component 34 being automatically activated to 100% brightness is not desirable. For instance, when a truck is driving through a dark rural area, the lighting component 34 at 100% brightness may be found to be blinding when the camera $30_1$ is mounted in the interior of the truck. Further, in some States, garbage trucks are mandated to have a spotlight mounted on rear of the truck for the safety of the worker who is picking up the garbage and riding on the back of the truck. In this situation, the spotlight and the lighting component 34 may face each other such that the spotlight and the brightness of the lighting component 34 at 100% brightness may create light reflections that decrease quality of the video captured by the camera $30_1$. In this embodiment of the invention, the dimmer switch 38 allows for the user to customize the brightness of the lighting component 34 accordingly.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A camera apparatus for monitoring of a vehicle, the camera apparatus comprising:
   an external housing having a front side, a back side, and a base for mounting the apparatus on the vehicle;
   a camera module including a camera lens, the camera module capturing video data;
   a lighting component including a plurality of light-emitting diodes (LEDs) and having infra-red (IR) capabilities to provide a night vision mode;
   a dimmer switch controlling a brightness of the lighting component;
   a transmission medium coupled to the camera module to transmit the video data as a live video stream to an external device; and
   a mirror trigger that includes at least one threaded sealed hole and a screw-magnet, wherein the mirror trigger activates and deactivates a mirror function of the camera module.

2. The camera apparatus of claim 1, wherein the external housing is made of an alloy material.

3. The camera apparatus of claim 1, further comprising: a camera cover being fitted on a first opening on the front side of the external housing, wherein the camera lens and the lighting component faces the camera cover.

4. The camera apparatus of claim 1, wherein the apparatus has an IP69K rating.

5. The camera apparatus of claim 1, further comprising a plurality of sensors, wherein one of the plurality of sensors is a ambient light sensor.

6. The camera apparatus of claim 5, wherein when the ambient light sensor detects a high light level consistent with daytime, the lighting component is automatically deactivated.

7. The camera apparatus of claim 5, wherein when the ambient light sensor detects a low light level consistent with nighttime, the lighting component is automatically activated and the night vision mode is automatically activated.

8. The camera apparatus of claim 7, wherein, when the ambient light sensor detects the low light level consistent with nighttime and a signal is received from the dimmer switch indicating that the dimmer switch is triggered once, the brightness of the lighting component is decreased by a first predetermined amount.

9. The camera apparatus of claim 8, wherein, when the ambient light sensor detects the low light level consistent with nighttime and a signal is received from the dimmer switch indicating that the dimmer switch is triggered twice, the brightness of the lighting component is decreased by a second predetermined amount being greater than the first predetermined amount.

10. The camera apparatus of claim 9, further comprising a camera processor being coupled to and controlling the operations of the camera module, the lighting component, the dimmer switch, and the plurality of sensors.

11. The camera apparatus of claim 1, wherein the dimmer switch is located on the back side of the external housing.

12. The camera apparatus of claim 1, further comprising a microphone being located on the back side or the underside of the external housing.

13. A system for monitoring of a plurality of vehicles, the system comprising:
- a plurality of cameras, wherein each of the cameras includes:
  - an external housing having a front side and a back side, the external housing being made of an alloy material,
  - a camera module including a camera lens, the camera module capturing video data,
  - a lighting component including a plurality of light-emitting diodes (LEDs) and having infra-red (IR) capabilities to provide a night vision mode,
  - a dimmer switch controlling a brightness of the lighting component, and
  - a transmission medium coupled to the camera module to transmit the video data as a live video stream; and
- the network device including:
  - a communication interface coupled to the transmission medium of each of the cameras to receive the live video stream from each of the cameras, and coupled to a cloud storage to transmit the live video stream to the cloud storage, and
  - a recording unit to record the live video stream,
  - wherein the cloud storage is accessed by at least one client device coupled to receive the live video stream, and wherein the cloud storage is accessed by the at least one client device to receive, upon request, video data corresponding to a time and a date from the cloud storage.

14. The system of claim 13, wherein each of the cameras have an IP69K rating.

15. The system of claim 13, wherein each of the cameras further comprises a plurality of sensors, wherein one of the plurality of sensors is a ambient light sensor.

16. The system of claim 15, wherein when the ambient light sensor detects a high light level consistent with daytime, the lighting component is automatically deactivated.

17. The system of claim 15, wherein when the ambient light sensor detects a low light level consistent with nighttime, the lighting component is automatically activated and the night vision mode is automatically activated.

18. The system of claim 17, wherein, when the ambient light sensor detects the low light level consistent with nighttime and a signal is received from the dimmer switch indicating that the dimmer switch is triggered once, the brightness of the lighting component is decreased by a first predetermined amount.

19. The system of claim 18, wherein, when the ambient light sensor detects the low light level consistent with nighttime and a signal is received from the dimmer switch indicating that the dimmer switch is triggered twice, the brightness of the lighting component is decreased by a second predetermined amount being greater than the first predetermined amount.

20. The system of claim 13, wherein the dimmer switch is located on the back side of the external housing.

21. The system of claim 13, wherein each of the cameras further comprises a microphone being located on the back side or the underside of the external housing.

22. The system of claim 13, wherein the communication interface of the network device includes a wireless interface that is used to transmit the live video stream to the cloud storage.

23. The system of claim 13, wherein the communication interface of the network device includes a mobile communication interface that is used to transmit the live video stream to the cloud storage, wherein the mobile communication interface communicates with a mobile telecommunication network including at least one of 3G and 4G.

24. The system of claim 13, wherein the network device further comprises an input sensing unit that senses inputs of the communication interface to determine if the cameras are coupled to the inputs.

25. The system of claim 24, wherein if the input sensing unit sense one of the cameras to not be connected to the communication interface, the communication interface sends no data to the cloud storage from that one camera, and wherein if the input sensing unit senses one of the cameras to be connected to the communication interface, the communication interface transmits the live video stream to the cloud storage.

26. A system for monitoring of a plurality of vehicles, the system comprising:
- a plurality of cameras, wherein each of the cameras includes:
  - an external housing having a front side and a back side, the external housing being made of an alloy material,
  - a camera module including a camera lens, the camera module capturing video data,
  - a lighting component including a plurality of light-emitting diodes (LEDs) and having infra-red (IR) capabilities to provide a night vision mode,
  - a dimmer switch controlling a brightness of the lighting component, and
  - a transmission medium coupled to the camera module to transmit the video data as a live video stream; and the network device including:
- a communication interface coupled to the transmission medium of each of the cameras to receive the live video stream from each of the cameras, and coupled to a cloud storage to transmit the live video stream to the cloud storage, and
- a recording unit to record the live video stream, wherein the network device is further coupled to the plurality of vehicles on which the plurality of cameras are mounted, respectively, and the network device further receives data from a plurality of vehicle sensors included on the vehicles.

27. The system of claim 26, wherein the plurality of vehicle sensors include at least one of: temperature sensors, speed sensors, door status sensors, engine loading sensors, water data sensors, and oil data sensors.

28. A system for monitoring of a plurality of vehicles, the system comprising:
- a plurality of cameras, wherein each of the cameras includes:
  - an external housing having a front side and a back side, the external housing being made of an alloy material,
  - a camera module including a camera lens, the camera module capturing video data,
  - a lighting component including a plurality of light-emitting diodes (LEDs) and having infra-red (IR) capabilities to provide a night vision mode,
  - a dimmer switch controlling a brightness of the lighting component, and
  - a transmission medium coupled to the camera module to transmit the video data as a live video stream; and
- the network device including:
  - a communication interface coupled to the transmission medium of each of the cameras to receive the live video stream from each of the cameras, and coupled to a cloud storage to transmit the live video stream to the cloud storage,
  - a location tracking unit that receives the location of the network device, and
  - a recording unit to record the live video stream, wherein the recording unit included in the network device records the location of the network device in association with the live video stream, and the communication interface transmits the location of the network device with the live data stream to the cloud storage.

29. The system of claim 28, wherein the cloud storage is accessed by at least one client device to receive the location of the network device and the live data stream, wherein the at least one client device displays the live data stream with the corresponding location of the network device on a map.

* * * * *